(12) United States Patent
Tsai

(10) Patent No.: US 8,274,937 B2
(45) Date of Patent: Sep. 25, 2012

(54) METHOD AND APPARATUS FOR BEAMFORMING IN OFDM WIRELESS SYSTEM

(75) Inventor: Jiann-An Tsai, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 687 days.

(21) Appl. No.: 12/455,689

(22) Filed: Jun. 5, 2009

(65) Prior Publication Data

US 2010/0054200 A1 Mar. 4, 2010

Related U.S. Application Data

(60) Provisional application No. 61/190,140, filed on Aug. 26, 2008.

(51) Int. Cl.
 *H04W 4/00* (2009.01)
 *H04B 7/02* (2006.01)
(52) U.S. Cl. ........ 370/329; 370/338; 375/267; 455/101; 455/561
(58) Field of Classification Search .......... 370/328–338; 375/260, 267, 292, 299; 455/13.3, 101, 422.1–424, 455/507, 561, 562.1; 343/372–386
See application file for complete search history.

(56) References Cited

U.S. PATENT DOCUMENTS

| | | | |
|---|---|---|---|
| 6,697,643 B1 * | 2/2004 | Hagerman et al. ......... | 455/562.1 |
| 6,728,233 B1 * | 4/2004 | Park et al. ..................... | 370/342 |
| 2005/0047384 A1 * | 3/2005 | Wax et al. ..................... | 370/338 |
| 2006/0133530 A1 * | 6/2006 | Kwak et al. ................... | 375/267 |
| 2006/0209980 A1 | 9/2006 | Kim et al. | |
| 2009/0098838 A1 * | 4/2009 | Guo et al. ..................... | 455/101 |

FOREIGN PATENT DOCUMENTS

| | | |
|---|---|---|
| KR | 10-2006-0096360 | 9/2006 |
| WO | WO 00/04728 | 1/2000 |
| WO | WO 01/43309 | 6/2001 |

OTHER PUBLICATIONS

International Search Report dated Mar. 11, 2010 in connection with International Application No. PCT/KR2009/004766.

* cited by examiner

*Primary Examiner* — Afsar M. Qureshi

(57) ABSTRACT

Systems and methods are disclosed for use in a wireless network that promotes simultaneous beamforming. These systems and methods include determining the Channel Quality Indicator (CQI) and Best Beam Index (BBI) for communications between a plurality of mobile stations and a base station, ranking the plurality of mobile stations in a list according to the determined CQI and BBI, and selecting a subset of the plurality of mobile stations for simultaneous beamformed communications. These systems and methods may also include verifying that the selected subset of the plurality of mobile stations does not have a conflict and initiating beamformed communications. Certain embodiments of the BBI may be determined based on a predetermined codebook, which is a function of an antenna configuration, such as a uniform linear array (ULA) and a uniform circular array (UCA).

20 Claims, 14 Drawing Sheets

METHOD AND APPARATUS FOR BEAMFORMING IN OFDM WIRELESS SYSTEM

CROSS-REFERENCE TO RELATED APPLICATION(S) AND CLAIM OF PRIORITY

The present application is related to U.S. Provisional Patent No. 61/190,140, filed Aug. 26, 2008, entitled "METHODS AND APPARATUS OF CODEBOOK BASED MULTI-USER CLOSED LOOP TRANSMIT BEAMFORMING (MU-CLTB) FOR OFDM WIRELESS SYSTEMS". Provisional Patent No. 61/190,140 is assigned to the assignee of the present application and is hereby incorporated by reference into the present application as if fully set forth herein. The present application hereby claims priority under 35 U.S.C. §119(e) to U.S. Provisional Patent No. 61/190,140.

TECHNICAL FIELD OF THE INVENTION

The present application relates generally to wireless communications and, more specifically, to simultaneously beamforming.

BACKGROUND OF THE INVENTION

Beamforming is a signal processing technique used in antenna arrays for directional signal transmission or reception. Spatial selectivity may be achieved through adaptive or fixed receive/transmit beam patterns. The use of spatial selectivity results in improvements that may be referred to as the receive/transmit gain (or loss).

In some implementations, beamforming takes advantage of interference to change the directionality of the array. In many wireless base stations, a plurality of transmitters are present. When transmitting an outgoing signal, the base station controls the phase and relative amplitude of the signal at each transmitter and creates a pattern of constructive and destructive interference in the transmitting wavefront. When a mobile device receives this outgoing signal, information from different sensors is combined in such a way that the expected pattern of radiation is preferentially observed.

Conventional transmit beamforming in wireless systems can be done with either closed-loop or open-loop manners. Open-loop systems are typically used with TDD (Time Division Duplexing) systems. TDD systems do not require channel information feedback. One disadvantage of open-loop system is that they must constantly conduct phase calibration in order to compensate the phase difference between transmission and reception RF chains among multiple transmit antennas. Another disadvantage is that it requires a constant uplink phase reference such as an uplink pilot and this can lead to an excessive feedback overhead. The process of phase calibration is generally costly, and sensitive to radio channel environment.

Closed-loop systems do not require the phase calibration processes that are required by open-loop systems. The lack of a need for the phase calibration process is due in part to the requirement that closed-loop systems have at least one channel feedback to the transmitter. One problem with the use of the closed-loop system is that the feedback creates a significant amount of overhead for the transmitted. In addition, closed-loop systems are sensitive to the feedback channel error due to feedback delay or fast channel variation. Typically, Frequency Division Duplexing (FDD) systems employs closed-loop transmit beamforming scheme. However, a closed-loop scheme can also be applied to TDD systems.

A practical closed-loop transmit beamforming scheme may be based on a codebook design. The closed-loop codebook-based transmit beamforming has been used for a scenario where a base station form a transmit antenna beam toward a single user at a time and at certain frequency. A codebook is a set of pre-determined antenna beams that are known to mobile stations.

SUMMARY OF THE INVENTION

In one embodiment, a method is disclosed for use in a wireless network that promotes simultaneous beamforming. This method includes determining the Channel Quality Indicator (CQI) for communications between a plurality of mobile stations and a base station, ranking the plurality of mobile stations in a list according to the determined CQI, and selecting a subset of the plurality of mobile stations for simultaneous beamformed communications. This method may also include verifying the selected subset of the plurality of mobile stations do not have a conflict and initiating beamformed communications.

In another embodiment, a wireless network is disclosed that includes a plurality of mobile stations. This network includes a first mobile station, wherein the first mobile station is capable of beamformed communication with a first base station. In addition, this network includes a second mobile station, wherein the second mobile station is capable of simultaneous beamformed communications with the first base station. In this network at least one of the first and second mobile stations transmit information to the base station that promotes the simultaneous beamformed communication between the first mobile station and the base station and the second mobile station and the base station.

In yet another embodiment, a base station capable of simultaneous beamformed communication with a plurality of mobile devices is disclosed that includes a computer readable medium comprising information related to at least one codebook that corresponds to an antenna configuration of the base station. This base station also includes a processor configured to access the computer readable medium and use the at least one codebook to provide simultaneous communication with a plurality of mobile stations and a transceiver coupled to the processor, The transceiver comprises a plurality of transmit antennas and is configured to receive information from a plurality of mobile stations and transfer this information to the processor, and the processor is configured to interpret the information, select a subset of mobile stations for simultaneous beamforming, and instruct the transceiver to allow for simultaneous beamforming with a plurality of mobile stations.

To address the above-discussed deficiencies of the prior art, it is a primary object to provide, for use in a wireless network, systems and methods that allow for a single base station to communicate simultaneous communication with a plurality of base stations.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
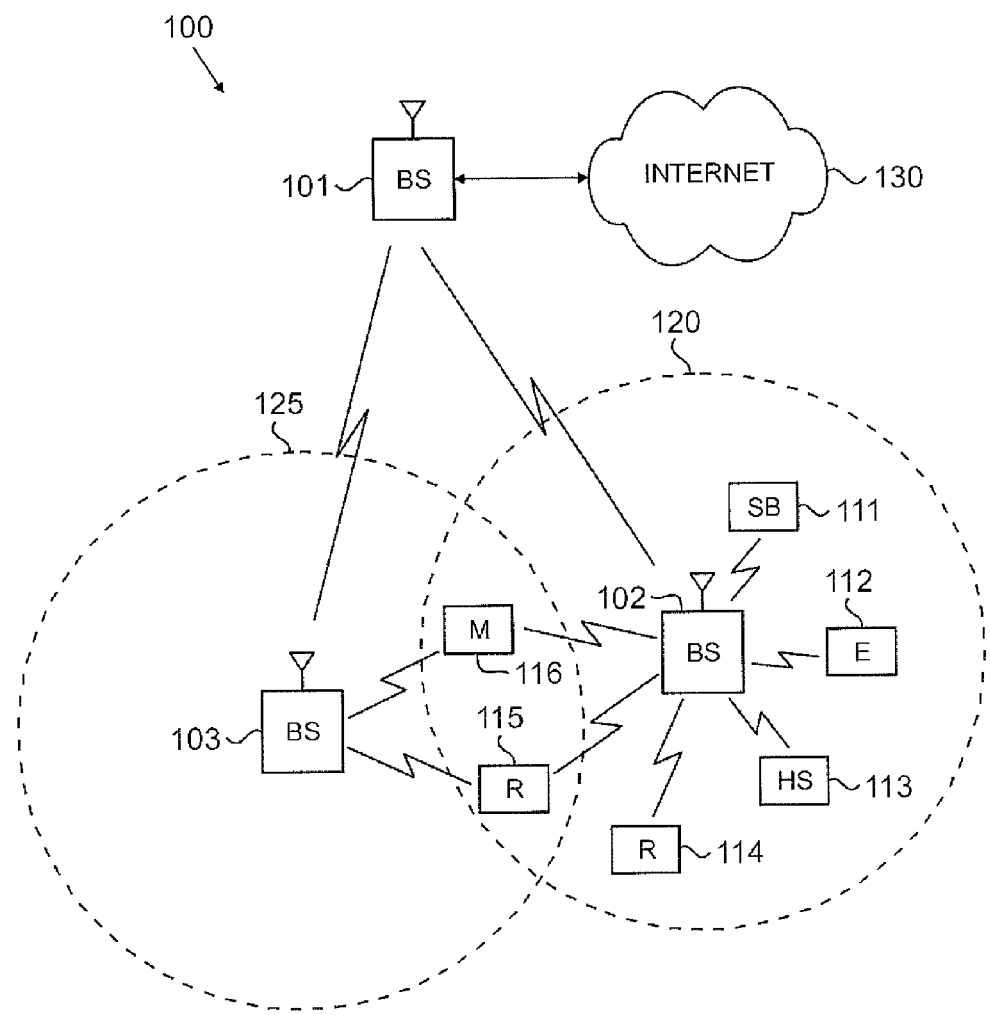
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of mobile stations within coverage area 120 of base station 102. The first plurality of mobile stations includes mobile station 111, which may be located in a small business (SB), mobile station 112, which may be located in an enterprise (E), mobile station 113, which may be located in a WiFi hotspot (HS), mobile station 114, which may be located in a first residence (R), mobile station 115, which may be located in a second residence (R), and mobile station 116, which may be a mobile device (M), such as a cell phone, a wireless laptop, a wireless PDA, or the like.

Base station 103 provides wireless broadband access (via base station 101) to Internet 130 to a second plurality of mobile stations within coverage area 125 of base station 103. The second plurality of mobile stations includes mobile station 115 and mobile station 116. In an exemplary embodiment, base stations 101-103 may communicate with each other and with mobile stations 111-116 using OFDM or OFDMA techniques.

Base station 101 may be in communication with either a greater number or a lesser number of base stations. Furthermore, while only six mobile stations are depicted in FIG. 1, it is understood that wireless network 100 may provide wireless broadband access to additional mobile stations. It is noted that mobile station 115 and mobile station 116 are located on the edges of both coverage area 120 and coverage area 125. Mobile station 115 and mobile station 116 each communicate with both base station 102 and base station 103 and may be said to be operating in handoff mode, as known to those of skill in the art.

Mobile stations 111-116 may access voice, data, video, video conferencing, and/or other broadband services via Internet 130. In an exemplary embodiment, one or more of mobile stations 111-116 may be associated with an access point (AP) of a WiFi WLAN. Mobile station 116 may be any of a number of mobile devices, including a wireless-enabled laptop computer, personal data assistant, notebook, handheld device, or other wireless-enabled device. Mobile stations 114 and 115 may be, for example, a wireless-enabled personal computer (PC), a laptop computer, a gateway, or another device.

Figure 2A:
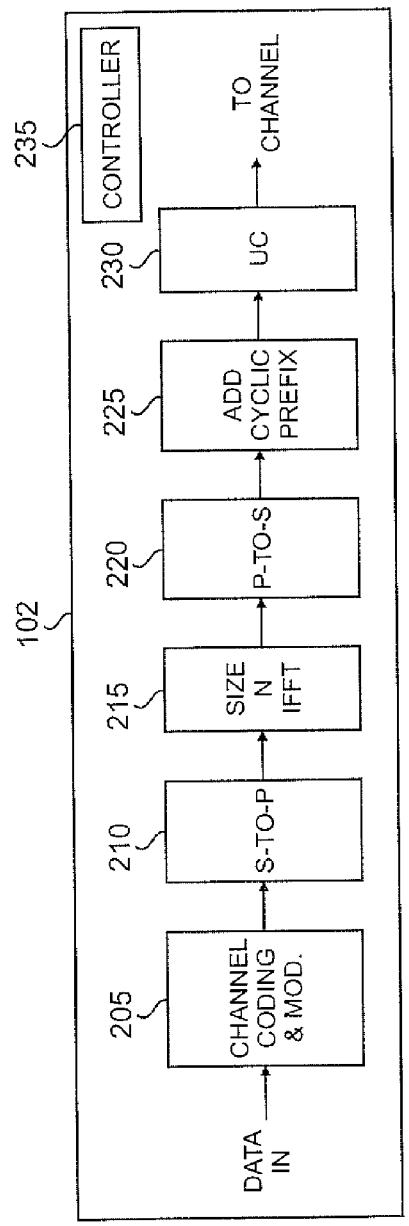
FIG. 2A is a high-level diagram of an orthogonal frequency division multiple access (OFDMA) transmit path.
Figure 2B:
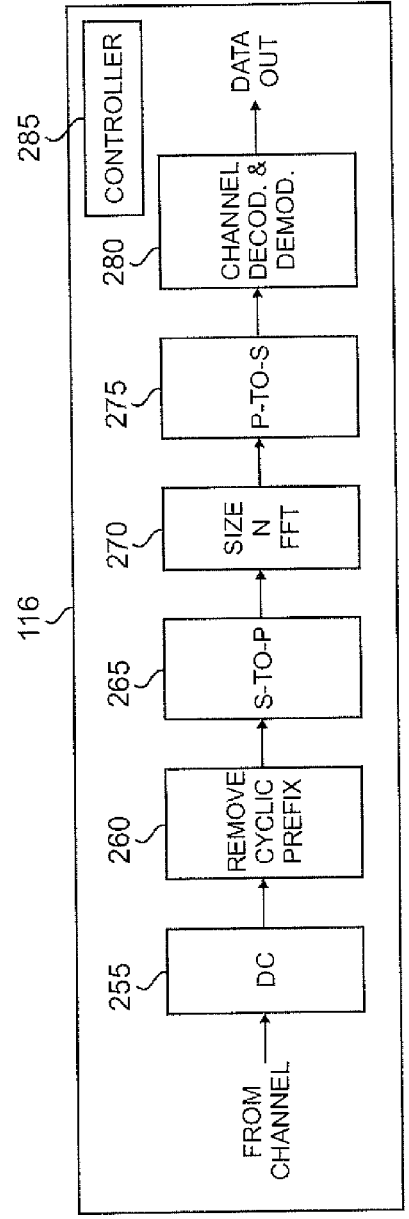
FIG. 2B is a high-level diagram of an orthogonal frequency division multiple access (OFDMA) receive path.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in mobile station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

FIG. 2A also shows controller 235, and FIG. 2B also shows controller 285. Controller 235 and 285 may be configured to control the various elements of FIGS. 2A and 2B, as well as configured to carry out other instructions consistent with this disclosure. Controller 235 and 285 may be implemented as a controller, a controller with a memory, or any other component capable of performing the functions of a controller.

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to mobile stations 111-116 and may implement a receive path that is analogous to receiving in the uplink from mobile stations 111-116. Similarly, each one of mobile stations 111-116 may implement a transmit path corresponding to the architecture for transmitting in the uplink to base stations 101-103 and may implement a receive path corresponding to the architecture for receiving in the downlink from base stations 101-103.

Figure 3:
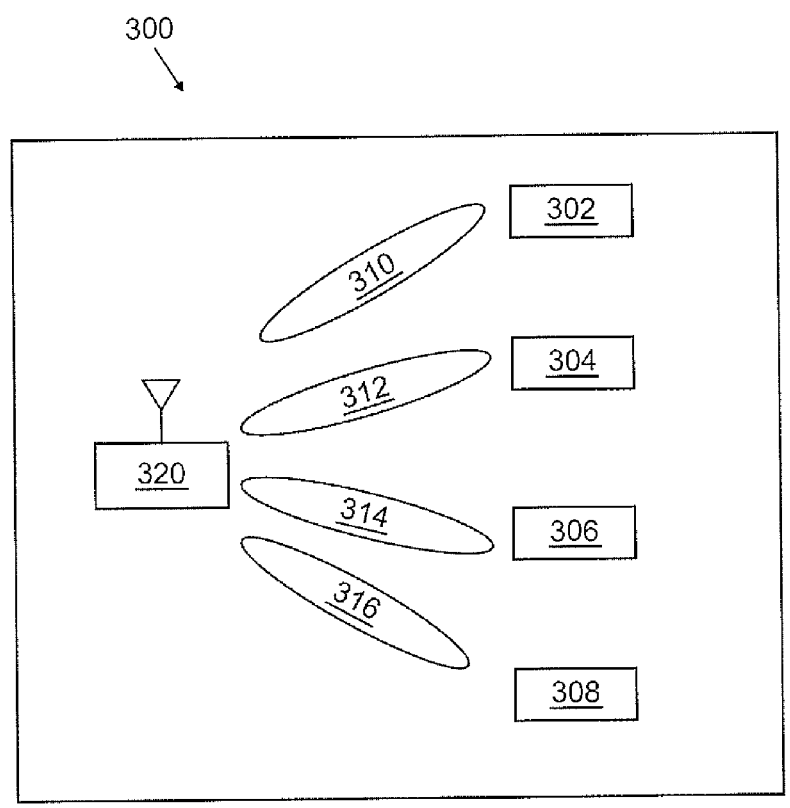
FIG. 3 illustrates an overview of a system with a plurality of mobile devices that receive beamformed signals from a base station according to an exemplary embodiment of the disclosure.

FIG. 3 is a diagram 300 of a base station 320 in communication with a plurality of mobile stations 302, 304, 306, and 308. In this embodiment, base station 320 is simultaneously beamforming through a plurality of transmitters to each mobile station. For instance, base station 320 transmits data to mobile station 302 through beamformed signal 310, data to mobile station 304 through beamformed signal 312, data to mobile station 306 through beamformed signal 314, and data to mobile station 308 through beamformed signal 316. In some embodiments of the present disclosure, base station 320 is capable of simultaneously beamforming to the mobile stations 302, 304, 306, and 308. In some embodiments, each beamformed signal is formed toward its intended mobile station at the same time and same frequency. For the purpose of clarity, the communication from a base station to a mobile station may also be referred to known as downlink communication and the communication from a mobile station to a base station may be referred to as uplink communication.

The base station 320 and mobile stations 302, 304, 306, and 308 employ multiple antennas for transmitting and receiving wireless signals. It is understood that the wireless signals may be radio wave signal, and the wireless signals may use any transmission scheme known to one skilled in the art, including an Orthogonal Frequency Division Multiplexing (OFDM) transmission scheme.

The mobile stations 302, 304, 306, and 308 may be any device that is capable receiving wireless signals. Examples of mobile stations 302, 304, 306, and 308 include, but are not limited to, a personal data assistant (PDA), laptop, mobile telephone, handheld device, or any other device that is capable of receiving the beamformed transmissions.

The OFDM transmission scheme is used to multiplex data in the frequency domain. Modulation symbols are carried on frequency sub-carriers. The quadrature amplitude modulation (QAM) modulated symbols are serial-to-parallel converted and input to the inverse fast Fourier transform (IFFT). At the output of the IFFT, N time-domain samples are obtained. Here N refers to the IFFT/fast Fourier transform (FFT) size used by the OFDM system. The signal after IFFT is parallel-to-serial converted and a cyclic prefix (CP) is added to the signal sequence. CP is added to each OFDM symbol to avoid or mitigate the impact due to multipath fading. The resulting sequence of samples is referred to as an OFDM symbol with a CP. At the receiver side, assuming perfect time and frequency synchronization are achieved, the receiver first removes the CP and the signal is serial-to-parallel converted before feeding it into the FFT. The output of the FFT is parallel-to-serial converted and the resulting QAM modulation symbols are input to the QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Because each OFDM symbol has finite duration in time domain, the sub-carriers overlap with each other in frequency domain. However, the orthogonality is maintained at the sampling frequency assuming the transmitter and receiver has perfect frequency synchronization. In the case of frequency offset due to imperfect frequency synchronization or high mobility, the orthogonality of the sub-carriers at sampling frequencies is destroyed, resulting in inter-carrier-interference (ICI).

Figure 4:
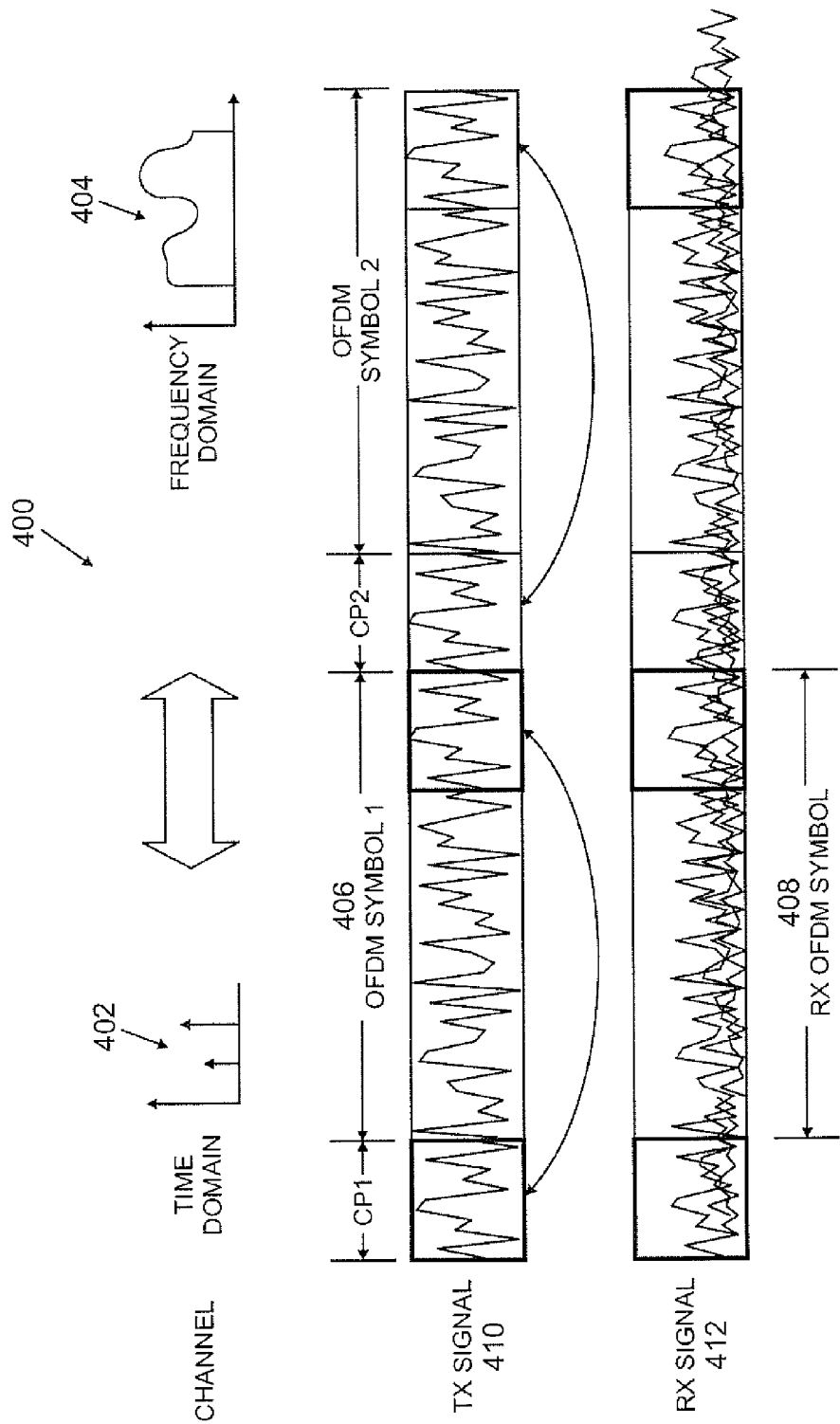
FIG. 4 illustrates an overview of an OFDM waveform in the time domain according to an exemplary embodiment of the disclosure.

A time domain illustration 400 of the transmitted OFDM symbol 406 in a transmission signal 410 and received OFDM symbol 408 in a received signal 412 is shown in FIG. 4. Due to multipath fading, the CP portion of the received signal is often corrupted by the previous OFDM symbol. However, as long as the CP is sufficiently long, the received OFDM symbol without CP should only contain its own signal convoluted by the multipath fading channel. In general, a Fast Fourier Transform (FFT) is taken at the receiver side to allow further processing frequency domain 404. The advantage of OFDM over other transmission schemes is its robustness to multipath fading. The multipath fading in time domain 402 translates into frequency selective fading in frequency domain 404. With the cyclic prefix or zero prefix added, the inter-symbol-interference between adjacent OFDM symbols is avoided or largely alleviated. Moreover, because each modulation symbol is carried over a narrow bandwidth, it experiences a single path fading. A simple equalization scheme can be used to combat frequency selection fading.

Figure 5:
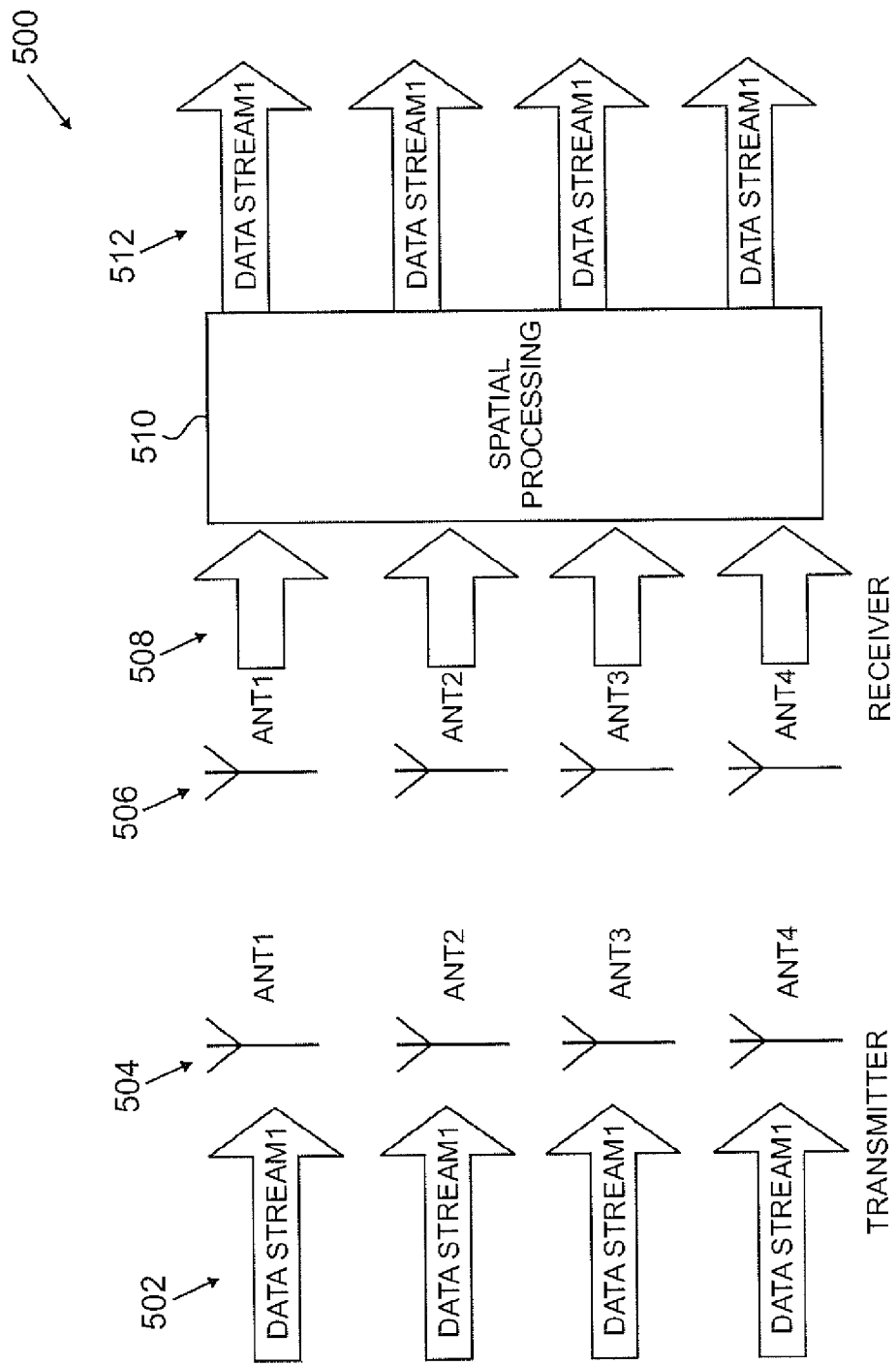
FIG. 5 is a flow diagram illustrating single user multiple in multiple out (SU-MIMO) Transmission/Reception according to an exemplary embodiment of the disclosure.

The use of multiple transmit antennas and multiple receive antennas at both a base station and a single mobile stations to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N), i.e. K=min(M,N). A MIMO system can be implemented with the schemes of spatial multiplexing, a transmit/receive beamforming, or transmit/receive diversity. As example of spatial multiplexing scheme, a simplified example of a 4×4 MIMO system is shown in FIG. 5. In this example 500, four different data streams 502 are transmitted separately using the four transmit antennas 504. The transmitted signals are received at the four receive antennas 506 and interpreted as received signals 508. Some form of spatial signal processing 510 is performed on the received signals 508 in order to recover the four data streams 512.

An example of spatial signal processing is Vertical-Bell Laboratories Layered Space-Time (V-BLAST) which uses the successive interference cancellation principle to recover the transmitted data streams. Other variants of MIMO schemes include schemes that perform some kind of space-time coding across the transmit antennas (e.g. Diagonal Bell Laboratories Layered Space-Time (D-BLAST)). In addition, MIMO can be implemented with a transmit/receive diversity scheme and a transmit/receive beamforming scheme to improve the link reliability or system capacity in wireless communication systems.

The MIMO channel estimation consists of estimating the channel gain and phase information for links from each of the transmit antennas to each of the receive antennas. Therefore, the channel response "H" for N×M MIMO system consists of an N×M matrix, as shown in EQUATION 1:

$$H = \begin{bmatrix} a_{11} & a_{12} & \ldots & a_{1M} \\ a_{21} & a_{22} & \ldots & a_{2M} \\ \vdots & \vdots & \ldots & \vdots \\ a_{N1} & a_{M2} & \ldots & a_{NM} \end{bmatrix} \quad (\text{EQUATION 1})$$

In EQUATION 1, the MIMO channel response is represented by H and $a_{nm}$ represents the channel gain from transmit antenna n to receive antenna m. In order to enable the estimations of the elements of the MIMO channel matrix, separate pilots may be transmitted from each of the transmit antennas.

As an extension of SU-MIMO, multi-user MIMO (MU-MIMO) is a communication scenario where a base station with multiple transmit antennas can simultaneously communicate with multiple mobile stations through the use of multi-user beamforming schemes such as SDMA (Spatial Division multiple Access) to improve the capacity and reliability of a wireless communication channel.

Figure 6:
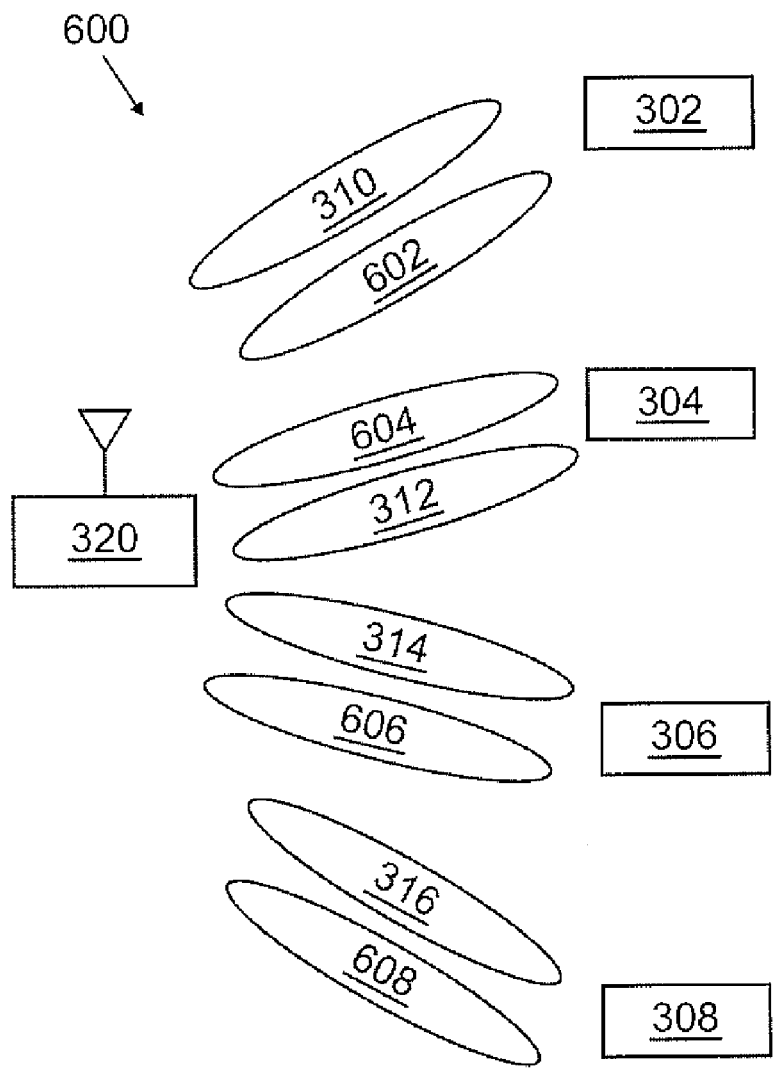
FIG. 6 is a diagram illustrating a multi-user transmit beamforming structure of a MUS-BF system according to an exemplary embodiment of the disclosure.

An example of an SDMA scheme is shown in FIG. 6, where a base station 320 is equipped with 8 transmit antennas while four mobile stations 302, 304, 306, and 308 are each equipped two antennas. In this example, the base station 320 has eight transmit antennas that each transmits one of beamformed signals 310, 602, 604, 312, 314, 606, 316, and 608. In this example, the mobile station 302 receives beamformed transmissions 310 and 602, mobile station 304 receives beamformed transmissions 604 and 312, mobile station 306 receives beamformed transmissions 606 and 314, and mobile station 308 receives beamformed transmissions 608 and 316.

Since the base station 320 has eight transmit antenna beams (each antenna beam one stream of data streams), eight streams of beamformed data can be formed at a base station. Each mobile station can potentially receive up to 2 streams (beams) of data in this example. If each mobile station 302, 304, 306, and 308 were limited to only receive a single stream (beam) of data, instead of multiple streams simultaneously, this would be multi-user beamforming (e.g., MU-BF).

Multi-User closed-loop transmit beamforming (MU-CLTB) scheme of MIMO system allows the base station 320 to employ transmit beamforming and is communicated with simultaneously multiple mobile stations through the use of OFDM radio signal. The example of system level description for the proposed codebook-based MU-CLTB is shown in FIG. 6. As shown, the receiver of the proposed codebook-based MU-CLTB system at a mobile station consists of an antenna beam selection processing, which is used to determine the best antenna beam, based on certain performance such as maximum signal-to-noise ration (MSNR) or Minimum Mean Square Error (MMSE).

The best antenna beam information is fed back to a serving base station and is used for transmit beamforming purpose. As shown in FIG. 6, the transmitter of the proposed codebook-based MU-CLTB system at a base station consists of multi-user beamforming (MU-BF) processing, which can form multiple transmit antenna beams simultaneously towards multiple mobile stations, where each antenna beam carry one stream of data per mobile station. The detail MU-BF processing is described in the following sections.

In a conventional OFDM system without MU-BF, the total system bandwidth is shared by multiple mobile stations in a way that the system bandwidth is divided into multiple sub-bands. Each sub-band can be assigned to a mobile station.

This is also known as Orthogonal Frequency Division Multiple Access (OFDMA), where each mobile station shares an orthogonal frequency domain resource each other, thus no interference among mobile stations. With the use of multiple transmit antennas at a base station, the systems capacity may be increased for OFDM systems by generating an orthogonal antenna beam or semi-orthogonal antenna. Each sub-band can shared by multiple mobile stations with multiple transmit beam pointing toward physically separated mobile stations. This way, the spectral efficiency of the system would improve as compared as the case of per user per sub band.

Based on the feedback information of the best beam index from multiple mobile stations, a base station conduct MU-BF algorithm to improve systems capacity. The proposed MU-BF algorithm includes multi-user scheduling, multi-user grouping, and multi-user transmit beamforming.

In one embodiment, the proposed MU-BF algorithm employs a codebook, which consists of a set of pre-determined antenna beams that are known to mobile stations. The set of the antennas beams is formed based on the antenna array response vectors of a serving base station, which is a function of antenna spacing, angle of arrival, and antenna configuration (for example, uniform linear array or uniform circular array). The antenna array response vector is cell-specific, which can be carried through the use broadcasting channel (BCH) in a real cellular system. A mobile station can then select the best antenna beam and feed it back to its serving base station in order to improve system throughput. The best antenna beam information is selected from the set of pre-determined antenna beams based on certain performance criteria such as maximizing Signal-to-Noise ratio (SNR). The performance enhancement of the proposed closed loop transmits beamforming (CLTB) for wireless systems is two folds. One is to boost signal energy due to beamforming gain, which results in signal to noise ratio (SNR) gain. The other is to reduce unnecessary radiated signal energy to other neighboring base stations due to a narrower radiation beam pattern, which results in Signal-to-Interference (SIR) ratio improvement in a wireless cellular system. The overall system enhancement of CLTB is combination of SNR and SIR gains, which depend on the operating load of systems. For instance, in a lightly loaded system (or coverage-limited system), SNR gain is dominant; while in a heavy-loaded system (or interference-limited system) SIR gain is dominant.

In order to use MU-CLTB, there needs to be a unique and innovative codebook design. The proposed codebook is not fixed, but adaptable in the sense that codebook design is optimized for each cell, base station, or other situation. That is, the codebook is cell-specific, and is generated based the antenna configuration, antenna spacing, and the number of antenna of its serving base station.

In one embodiment, a proposed codebook is a set of transmit beamforming vectors, Cj with $\{j=1,2,\ldots J\}$, which are used to form a set of pre-determined antenna beams. J is the size of codebook or the number of transmit beam vectors. A mobile station can then select the best antenna beam and feed it back to its serving base station in order to improve system throughput. Cj is formed by the antenna array response vector of a serving base station, which is function of antenna spacing, angle of arrival, antenna configuration (uniform linear array, uniform circular array), and antenna polarization.

Figure 8:
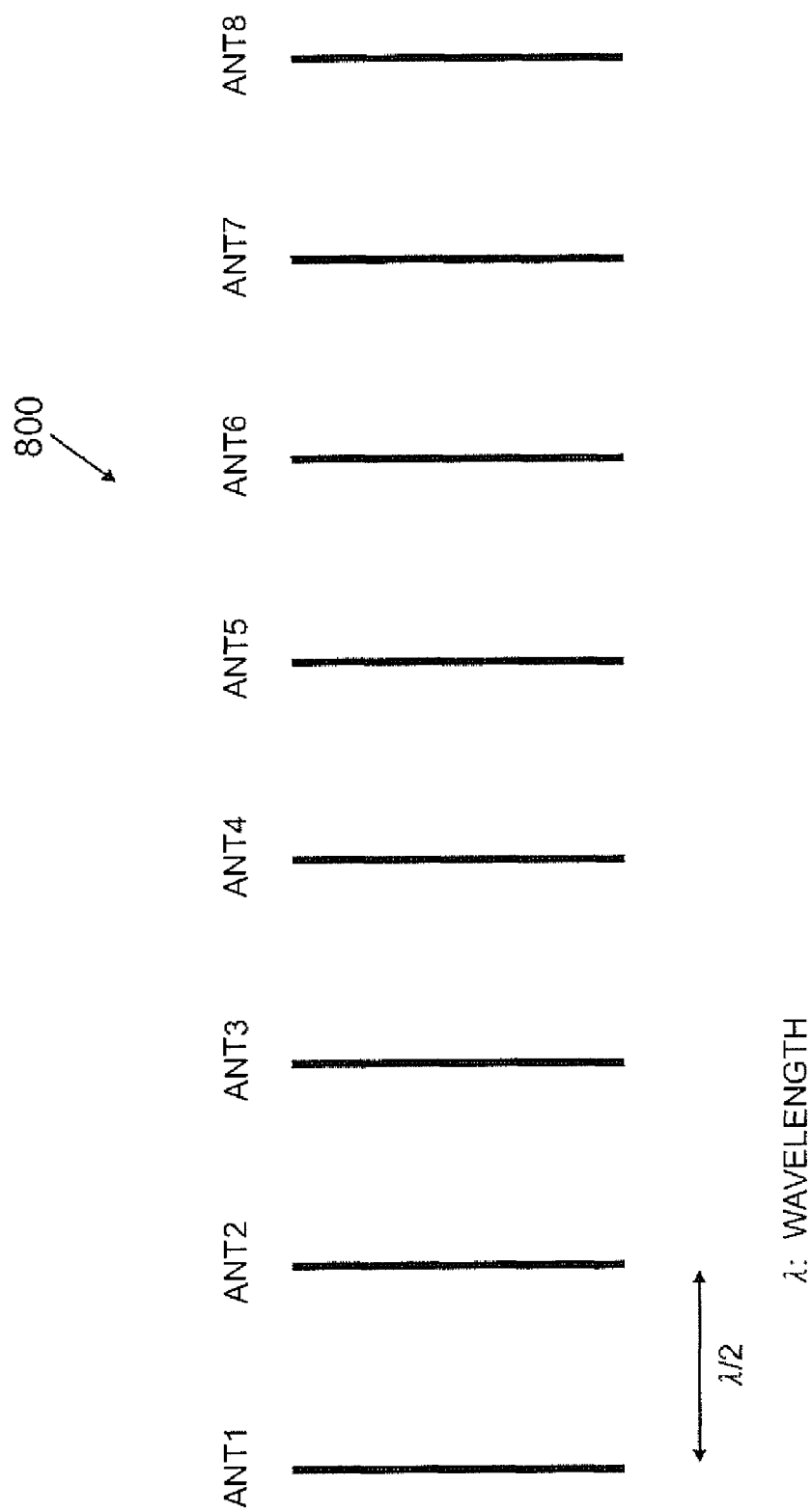
FIG. 8 is a diagram illustrating a uniform linear antenna array (ULAA) according to an exemplary embodiment of the disclosure.

For example as shown in FIG. 8, in a uniform linear array (ULA) 800, the proposed beamforming codebook is given by EQUATION 2, shown below.

$$C_j = \begin{bmatrix} w_1(\theta_j) \\ w_2(\theta_j) \\ \vdots \\ w_P(\theta_j) \end{bmatrix} = \begin{bmatrix} 1 \\ e^{-j2\pi \frac{D}{\lambda} \sin(\theta_j)} \\ e^{-j2\pi \frac{2D}{\lambda} \sin(\theta_j)} \\ \vdots \\ e^{-j2\pi \frac{(P-1)D}{\lambda} \sin(\theta_j)} \end{bmatrix} / \sqrt{P}. \quad \text{(EQUATION 2)}$$

In EQUATION 2, for transmit vectors $j=1,\ldots,J$, the result of each vector is shown. In EQUATION 2, P is the number of transmit antenna, D is the antenna element spacing, $\lambda$ is equal to $c/f\_c$ where c is the speed of light and $f\_c$ is the carrier frequency. Here $\theta_j$ is the j'th angle of departure of the jth transmit antenna beam at a base station.

The set of $\theta j$ s, $j=1,\ldots,J$, is specified and known at both the serving base station and all mobile stations in the cell. One example of the set of $\theta j$ s, $j=1,\ldots,J$, is a set where all beams have uniform angular spacing. In particular, in a 3-sector system where each sector has 120 degrees angular spacing, the set $\theta j$ s, $j=1,\ldots,J$, is given by EQUATION 3 if the reference angle (i.e., 0-degree direction) corresponds to the section, and EQUATION 4 if the reference angle, i.e., 0-degree direction, corresponds to the center of the sector. EQUATION 5 is another example of the 3-sector system where each sector also has 120 degrees angular spacing.

$$\theta_j = (j+1/2) * \frac{120}{J} \text{ (degrees)} \quad \text{(EQUATION 3)}$$

$$\theta_j = (j+1/2) * \frac{120}{J} - 60 \text{ (degrees)} \quad \text{(EQUATION 4)}$$

$$\theta_j = ((j-1)+1/2) * \frac{120}{J} - 60 \text{ (degrees)} \quad \text{(EQUATION 5)}$$

Another example of the set of $\theta j$ s, $j=1,\ldots,J$, is a set where the beams do not uniform equal angular spacing. This is useful if the base station 320 has the prior knowledge of the geographical locations of the mobile stations 302, 304, 306, and 308, and can add more beam granularity in directions where there are a large concentration of mobile stations 302, 304, 306, and 308, while reducing beam granularity in directions where there are less amount of mobile stations.

Figure 9:
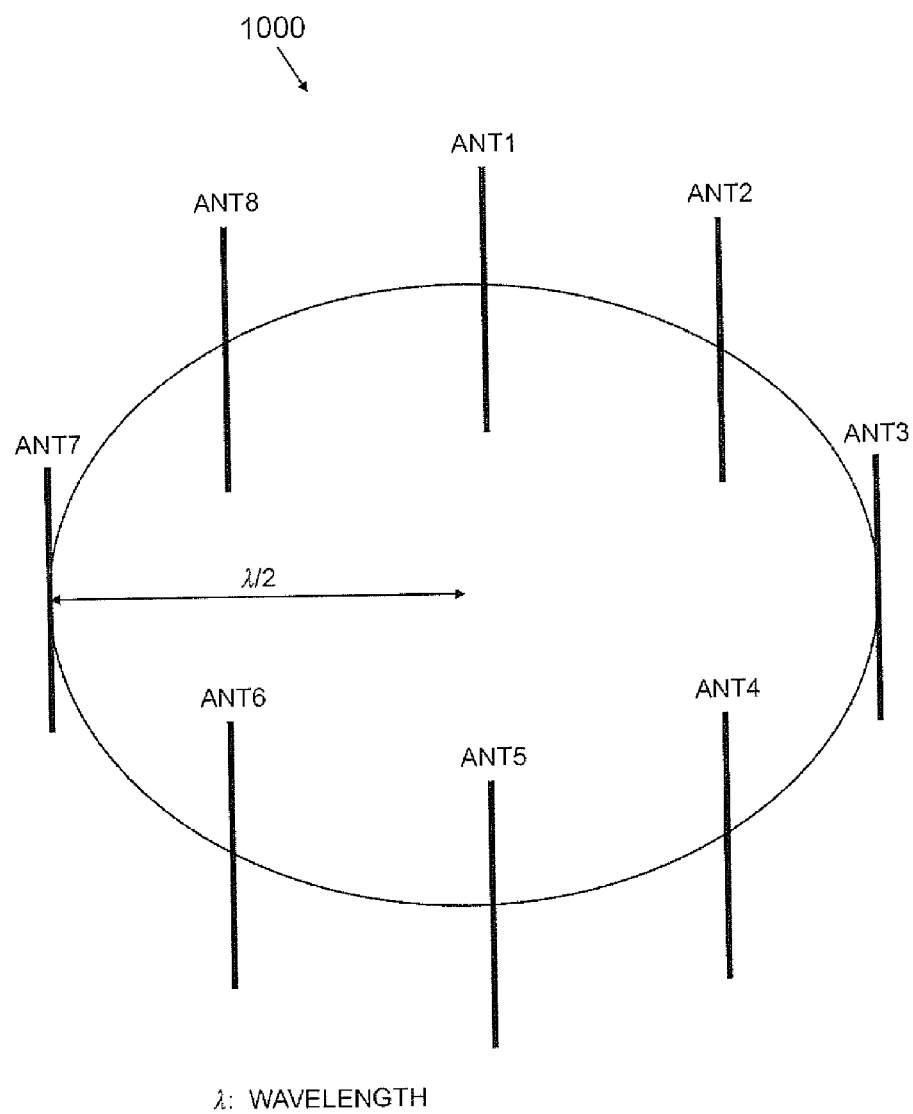
FIG. 9 is a diagram illustrating is a uniform circular antenna array (UCAA) according to an exemplary embodiment of the disclosure.

In another embodiment shown in FIG. 9, for a uniform circular array (UCA) 900, the proposed beamforming codebook is given by EQUATION 6, shown below.

$$C_j = \begin{bmatrix} w_1(\theta_j) \\ w_2(\theta_j) \\ \vdots \\ w_P(\theta_j) \end{bmatrix} = \begin{bmatrix} 1 \\ e^{-j2\pi \frac{R}{\lambda} \sin(\zeta)\cos(\theta_j - \phi_1)} \\ e^{-j2\pi \frac{R}{\lambda} \sin(\zeta)\cos(\theta_j - \phi_2)} \\ \vdots \\ e^{-j2\pi \frac{R}{\lambda} \sin(\zeta)\cos(\theta_j - \phi_P)} \end{bmatrix} / \sqrt{P} \quad \text{(EQUATION 6)}$$

In this equation, R is the circular radius of the antenna array, $\zeta$ is the elevation angle. For simplicity, only azimuth angles are considered in the propagation geometry $\zeta=90$ degrees) but the results can be generalized to three dimensions. The antenna array response vector $C_{j\_}\{j=1,2,\ldots J\}$ is cell-specific, and can be carried out through the use broadcasting channel (BCH) in a real cellular wireless system. The advantage of proposed codebook-base design is that it ensures the codebook design is optimized for each cell-site since in a real deployment the antenna configuration among adjacent cell-sites maybe quite different.

It is understood that the uniform linear array may be preferred in sectorized cell, while uniform circular array may be preferred in an omni-directional cell. To mitigate the effect of antenna side lobes due large antenna spacing, the disclosed codebook Cj uses a closed antenna spacing such as 0.5 wavelength. However, it is understood that any spacing may be used consistent with the present disclosure.

Similar to the ULA case, here $\theta j$ is the j'th angle of departure of the jth transmit antenna beam at a base station. The set of $\theta j$ s, j=1, ..., J, is specified and known at both the serving base station and all mobile stations in the cell. One example of the set of $\theta j$ s, j=1, ..., J, is a set where all beams have uniform angular spacing. In particular, in a 3-sector system where each sector has 120 degrees angular spacing, the set $\theta j$ s, j=1, ..., J, is given by EQUATION 7 if the reference angle, i.e., 0-degree direction, corresponds to the section edge, or EQUATION 8 if the reference angle, i.e., 0-degree direction, corresponds to the center of the sector.

$$\theta_j = (j+1/2) * \frac{120}{J} \text{ (degrees)} \qquad \text{(EQUATION 7)}$$

$$\theta_j = (j+1/2) * \frac{120}{J} - 60 \text{ (degrees)} \qquad \text{(EQUATION 8)}$$

Another example of the set of $\theta j$ s, j=1, ..., J, is a set where the beams do not uniform equal angular spacing. This is useful if the base station have the prior knowledge of the geographical locations of the mobile stations, and can add more beam granularity in directions where there are a large concentration of mobile stations, while reducing beam granularity in directions where there are less amount of mobile stations.

The proposed MU-BF conduct multi-user transmit beamforming in conjunction with multi-user scheduling. We call this proposed MU-BF scheme as multi-user scheduling beamforming (MUS-BF). The proposed MUS-BF system is based on Channel Quality Indicator (CQI) and best beam index (BBI). CQI and BBI are the feedback information from each mobile station. CQI can be represented by MCS (modulation and coding selection) index in practical applications. BBI can also be represented by PMI (precoding matrix index) or PVI (preceding vector index).

It is understood that, in one embodiment, the BBI is determined based on a predetermined codebook, which is function of antenna configuration as shown in equation 2 and 5. Any other codebook that uses equations 2 and 5 as their subset can also be used. It is understood that a plurality of other equations not specifically disclosed but consistent with the embodiments and concepts disclosed herein may also be used.

In one embodiment of the invention, the proposed MUS-BF algorithm for the case of K user with maximum number of transmission stream of S is described in the following pseudo code in four stages.

Stage 1: Initialization

```
User_k = 1;
Beam_Seperation = 2;
Stream_j = 1;
NumMaxStream = S
```

-continued

```
CQI=[CQI1, CQI2,... CQIK];
Beta =0.8; % used for proportional fairness
User_Current_Average_Throughput=[UCAT1, UCAT2,..UCATK];
PVI=[PVI1, PVI2,...PVTK];
MUS_BF_Schedule_User=[ ]
```

Stage 2: Scheduling the best CQI user for a given sub-band by sorting CQI.

```
Scheduled_User_List=
    sort(CQI./User_Current_Average_Throughput.^Beta, 'descend');
```

Stage 3: Find the first scheduled user.

```
MUS_BF_Schedule_User(1)=Scheduled_User_List
    (Stream_j);
```

Stage 4: Find the rest of scheduled user for a given subband, based on Beam_Seperation requirement. Stage four is used to validate that the previously scheduled user MUS_BF_Schedule_User(1) does not conflict with the next scheduled user Scheduled_User_List(Stream_j). The term "conflict" is intended to refer to the status where one or more users are attempt to share the same beamformed data originating from the same antenna.

```
while ( (User_k < K) && (Stream_j <
NumMaxStream) )
        Beam_Diff =[ ];
    for jj = 1:Stream_j
        Stream_UE = Scheduled_User_List (jj);
        Beam_Diff(jj) = abs(PVI (Stream_UE) –
PVI (Scheduled_User_List (User_k+1)) );
    end
        if    sum(    Beam_Diff    >=
Beam_Seperation ) >= Stream_j
            Stream_j = Stream_j +1;
            User_k = User_k + 1;
            MUS_BF_Schedule_User(Stream_j)
= Scheduled_User_List (User_k);
        else
            User_k = User_k + 1;
        end
        if (Stream_j >= NumMaxStream )
            User_k = K;
        end
    end
```

Figure 7:
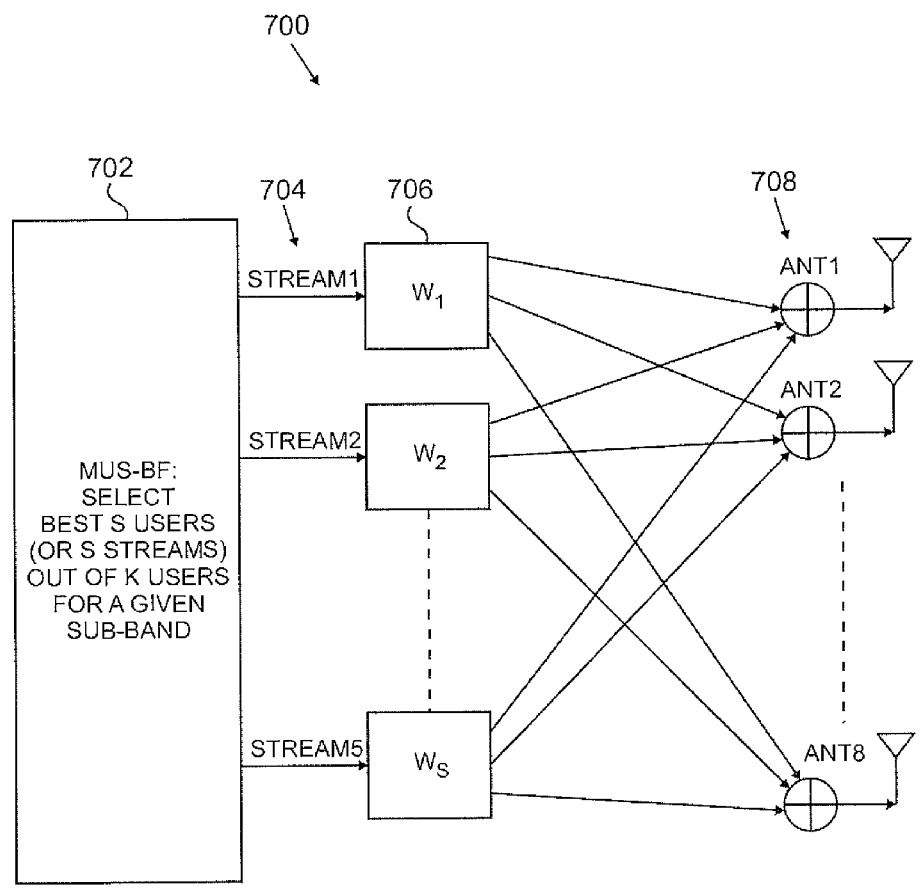
FIG. 7 is a diagram illustrating a multiple user multiple in multiple out (MU-MIMO) Transmission/Reception system according to an exemplary embodiment of the disclosure.

In another embodiment shown in FIG. 7, the multi-user transmit beamforming structure 700 of proposed MUS-BF algorithm for the case of K user with maximum number of transmission stream of S is shown as in FIG. 7. The MUS-BF makes a selection of the best S streams out of K users for a given sub band 702. The beamforming signal is the sum of the signals weighted by W1, W2, ... Wj, ... Ws 706 for stream 1, stream 2, stream j, and stream S 704, respectively. For the jth stream, Wj can be expressed as Wj=[Wj,1 Wj,2 ... Wj,8], where Wj,1 Wj,2 ... Wj,8 are the transmit beamforming weight for antenna 1, antenna 2, ... and antenna 8 708, respectively. Wj=[Wj,1 Wj,2 ... Wj,8], are called the beamforming vector, which is derived from a codebook. The transmit signal for antenna 1, say T1 for example, can be expressed as T1=W1,1*X1+W21*X2+W31*X3+ ... Ws1*Xs, where X1, X2, and Xs are modulated symbols such as QPSK or QAM for stream 1, stream 2, and stream s, respectively. For a given mobile station, the receiver signal for the proposed MUS-BF can be expressed as EQUATION 9, shown below.

$$Y = H*T + n \qquad \text{(EQUATION 9)}$$

Where Y is a received signal vector with size of M×1. M is number of received antennas. T is a transmit signal vector with size of S×1. H is channel matrix with size M×S. n is thermal noise vector with size of M×1. Several type of receiver architecture can be used, including Maximum Ratio Combining (MRC) and Minimum mean-squared error (MMSE).

In some embodiments, MMSE is recommended to be employed for the proposed MUS-BF scheme since it can provide better interference suppression capability over MRC. Multi-user transmission introduces inter-stream interference for typical MU-MIMO scheme when users are not completely located at orthogonal antenna beam physically. The inter-stream interference can be mitigated by MMSE receiver.

Two types of antenna configures for the proposed MUS-BF scheme can be employed in wireless cellular communication: One is uniform linear antenna array (ULAA) with small antenna spacing, for example 0.5 wavelength. The other is uniform circular antenna array (UCAA) with smaller circular radius, for example 0.5 wavelength. In another embodiment of the invention, two antenna configurations are employed with small antenna spacing and small circular radius spacing for ULAA and UCAA, respectively.

A unique antenna beam selection algorithm may be used in the proposed codebook-based MU-CLTB scheme. In other embodiments, the antenna selection processing is based on the common pilot signal transmitted from a base station. The best antenna beam information is selected from the set of pre-determined antenna beam based on certain performance criteria maximum signal-to-noise ration (MSNR) or Minimum Mean Square Error (MMSE). In the case of noise-dominant environment, MSNR is used while in the presence of interference dominant environment, MMSE is employed. For example, when MSNR is used, the transmit beamforming vector of the best antenna beam for the k'th subcarrier, Wk, can be selected $W=C_{j,max}$ where $\hat{H}_{p,m,k}$ denotes the channel estimate for transmit antenna p, receive antenna m in the kth subcarrier, as shown in EQUATION 10

$$C_{j,max} = \underset{j}{\operatorname{argmax}} \left\{ \sum_{k} \sum_{m=1}^{M} \sum_{p=1}^{\frac{P}{2}} w_p(\theta_j) \hat{H}_{p,m,k} \right\} \quad \text{(EQUATION 10)}$$

Based on the performance observed the proposed MU-CLTB not only provides significant system gain over the baseline system (without transmit beamforming), but provides signaling overhead reduction. There are two signaling overhead reductions with the proposed MU-CLTB: feedback rate and feedback bandwidth. The feedback rate means how often the channel information is fed back to a base station. The faster the feedback rate is, the larger the signaling overhead is. The feedback bandwidth is referred to how wide the bandwidth is required to feedback to a base station. The larger the feedback bandwidth is, the smaller is the feedback overhead.

The feedback rate of the proposed MU-CLTB can be signaling at the order of seconds, instead of milli seconds in a typical system. This results in significant overhead reduction. With this feedback rate, the signaling can be done at higher Layer (slower) signaling. Additionally, the feedback bandwidth of the proposed MU-CLTB is equal to the whole system bandwidth, instead of sub-band or sub-carrier. Note that sub-carrier is the smallest bandwidth unit in OFDM systems, and sub-band is referred as a group of sub-carriers Sub-band is regarded as partial system bandwidth. As compared to the prior art such as conventional open-loop transmit beamforming, the proposed MU-CLTB does not require phase calibration processing, which is generally costly and sensitive to radio channel variation. As compared to conventional closed-loop beamforming, the proposed MU-CLTB provide significant signaling overhead reduction and its codebook design is less sensitive to radio channel variation.

It is understood that for the mobile station to provide feedback to the base station, only one beamforming codeword choice may be used for the entire bandwidth. This in instead of having one codeword choice for every sub-band or every subcarrier. The use of a single code word results in significant saving of feedback bandwidth.

In another embodiment a higher layer signaling may be used to transmit the feedback information of beamforming codeword choice. The resulting feedback rate is much smaller than the conventional codebook based feedback scheme, where the feedback is carried on Physical layer signals.

As mentioned above, two types of reference signals for transmit beamforming systems are typically needed in wireless communication system: common reference signal and dedicated reference signals. Common reference signal is for CQI reporting and codeword choice reporting, while dedicated reference signal is only specific for data demodulation and detection when transmit beamforming is employed.

CQI (channel quality indication) may be used in some preferred embodiments for reporting the proposed MU-CLTB. Specifically, we consider the case where the number of common reference signal is less the number of transmit antennas. In this case, a δCQI is needed for CQI reporting due to the fact there is a CQI difference between CQI calculation based on dedicated signal and CQI calculation based on common reference signal. Example of δ CQI reporting for proposed MU-CLTB scheme is shown in FIG. 10.

Figure 10:
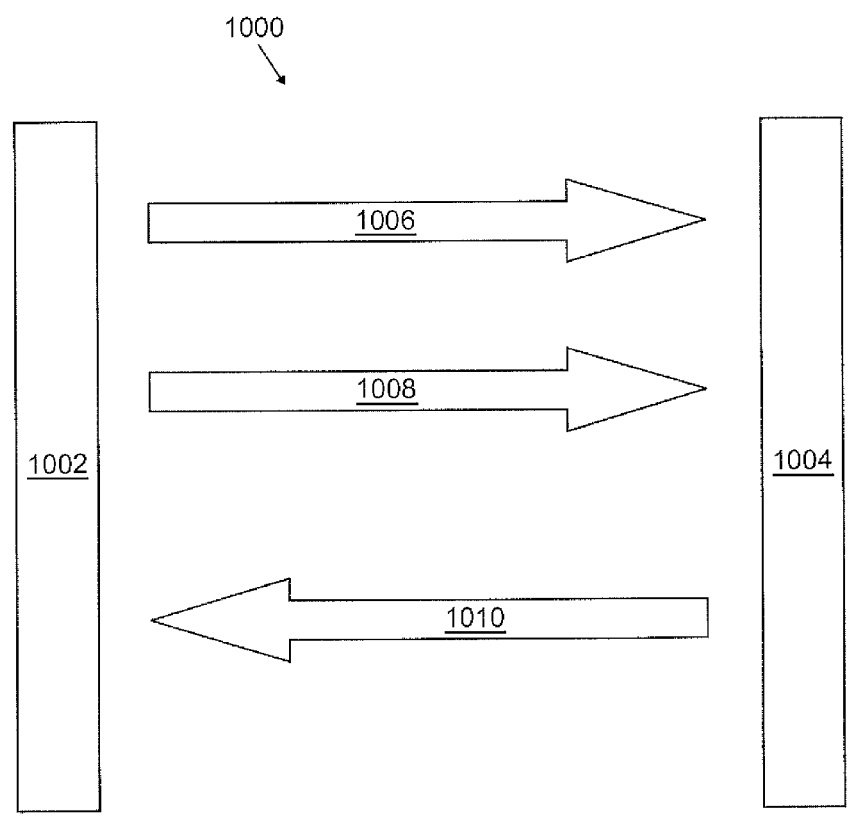
FIG. 10 is a flow diagram illustrating a δ CQI reporting for a MU-CLTB scheme according to an exemplary embodiment of the disclosure.

In FIG. 10, a base station 1002 and a mobile station 1004 are in communication. The base station 1002 transmits a common reference signal at the base station to the mobile station using signal 1005. The base station also transmits a dedicated reference signal transmitted on all of the antennas of the base station 1002. The mobile station provides both a normal CQO signal report and a δ CQI report.

In the embodiment shown in FIG. 10, a δ CQI reporting is added to report the channel estimation different between dedicated pilot and common pilot. This δ CQI reporting is in addition to the existing normal CQI reporting. Furthermore, the reporting frequency of the δ CQI can be different from the reporting frequency of the existing normal CQI.

Figure 11:
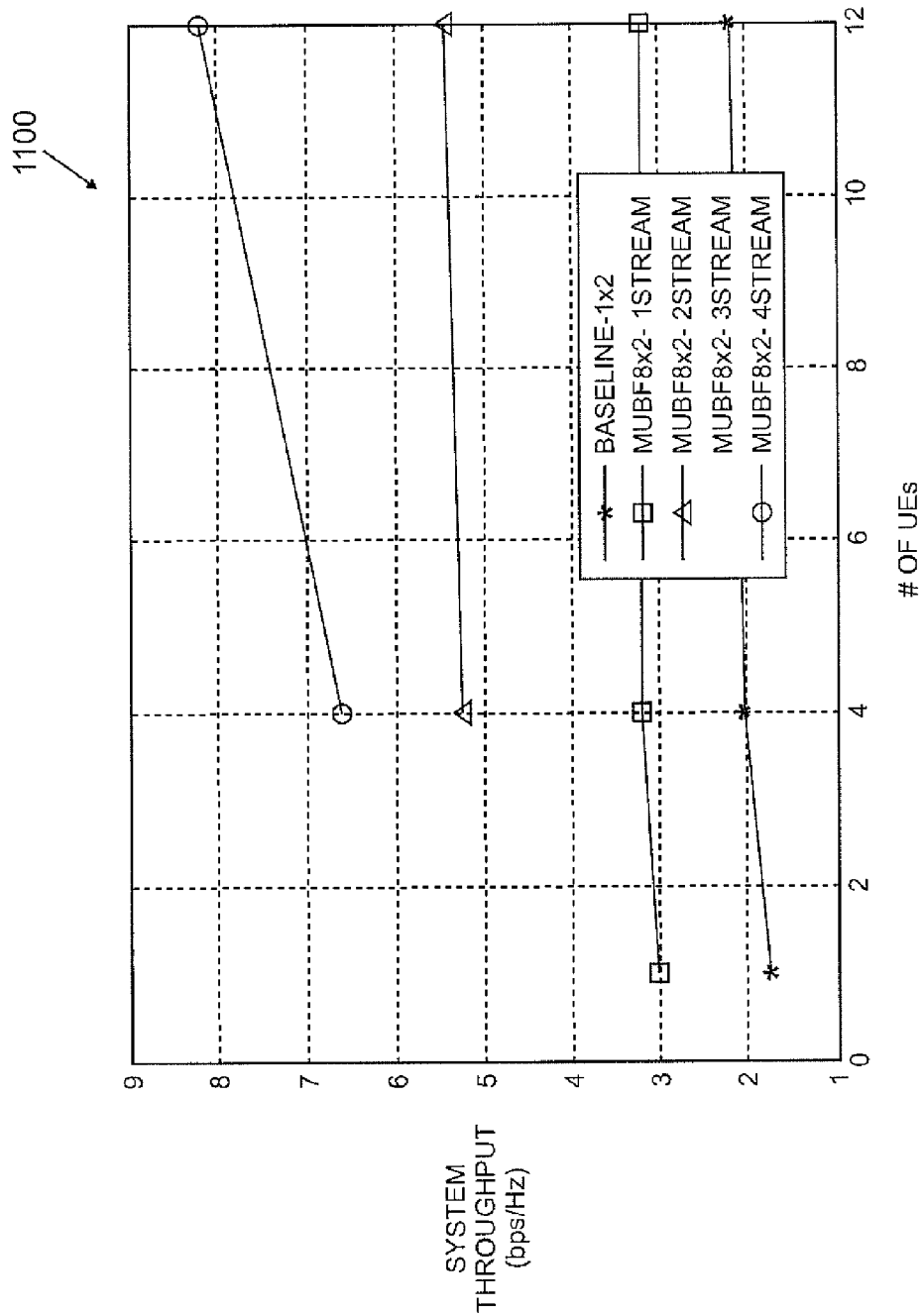
FIG. 11 is a graph illustrating the systems performance of the proposed MU-CLTB scheme and the baseline system according to an exemplary embodiment of the disclosure.

FIG. 11 illustrates a graph 1100 of the system performance of the proposed MU-CLTB systems. FIG. 11 shows the system throughput of a base station 320 when it communicates with multiple mobile stations 302, 304, 306, and 308 throughput the use of multiple beamforming (BF) schemes. The systems throughput is the average throughput per base station. In this figure, it is assumed that 8 transmit antenna array is employed at a base station 320 and 2 received antenna array at a mobile station 302, 304, 306, and 308 for the proposed scheme while a baseline system assume a single transmit antenna at a base station 320 and a two received antenna array at each mobile station. As shown, the proposed MU-CLTB (MU-BF) provides significant system throughput gain over a baseline system.

Figure 12:
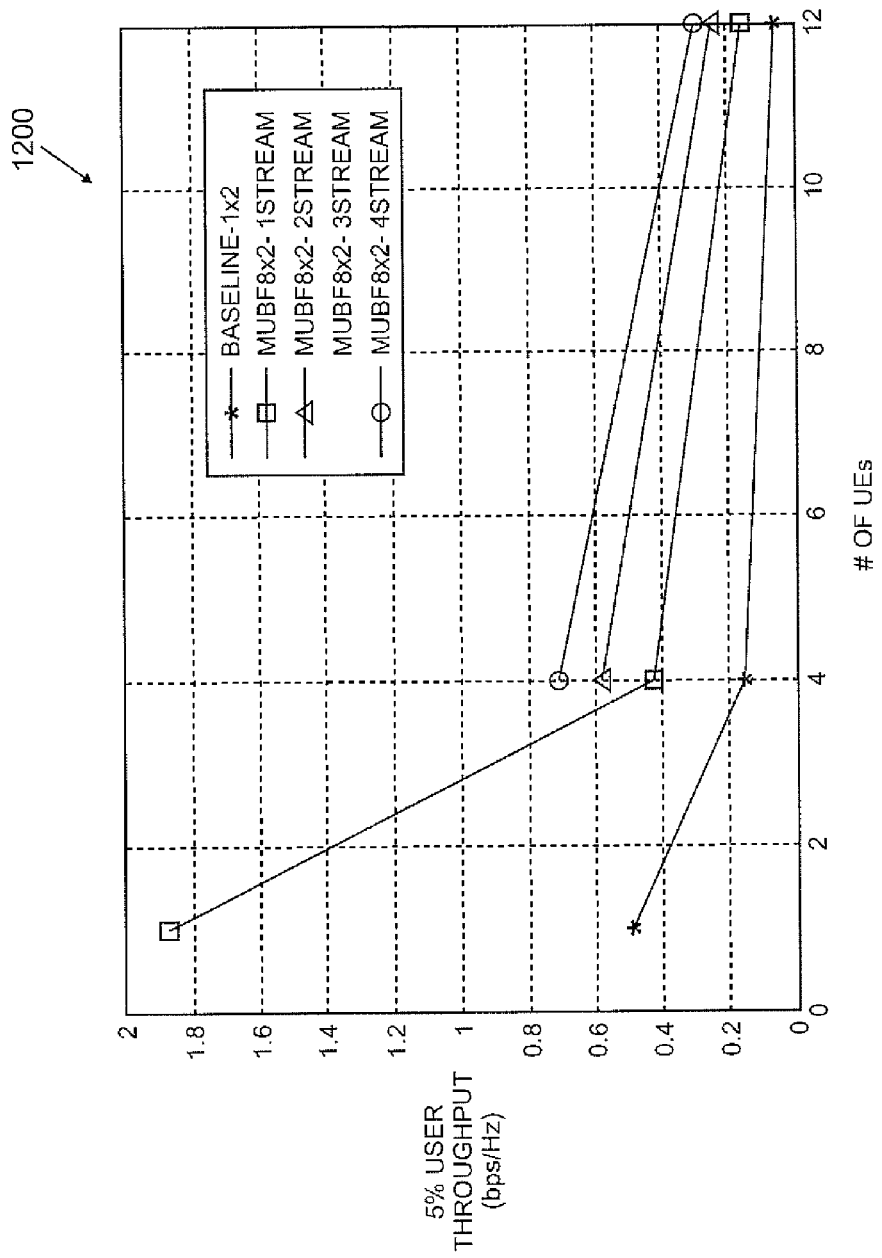
FIG. 12 is a graph illustrating cell-edge performance of the proposed MU-CLTB scheme and baseline system according to an exemplary embodiment of the disclosure.

FIG. 12 shows the improved cell-edge performance (or 5 percentile performance) of the proposed MU_CLTB. The results also show significant data throughput gain at a cell-edge. In the example shown in FIG. 12, the user equipment (UE) is intended to refer to a mobile station.

Figure 13:
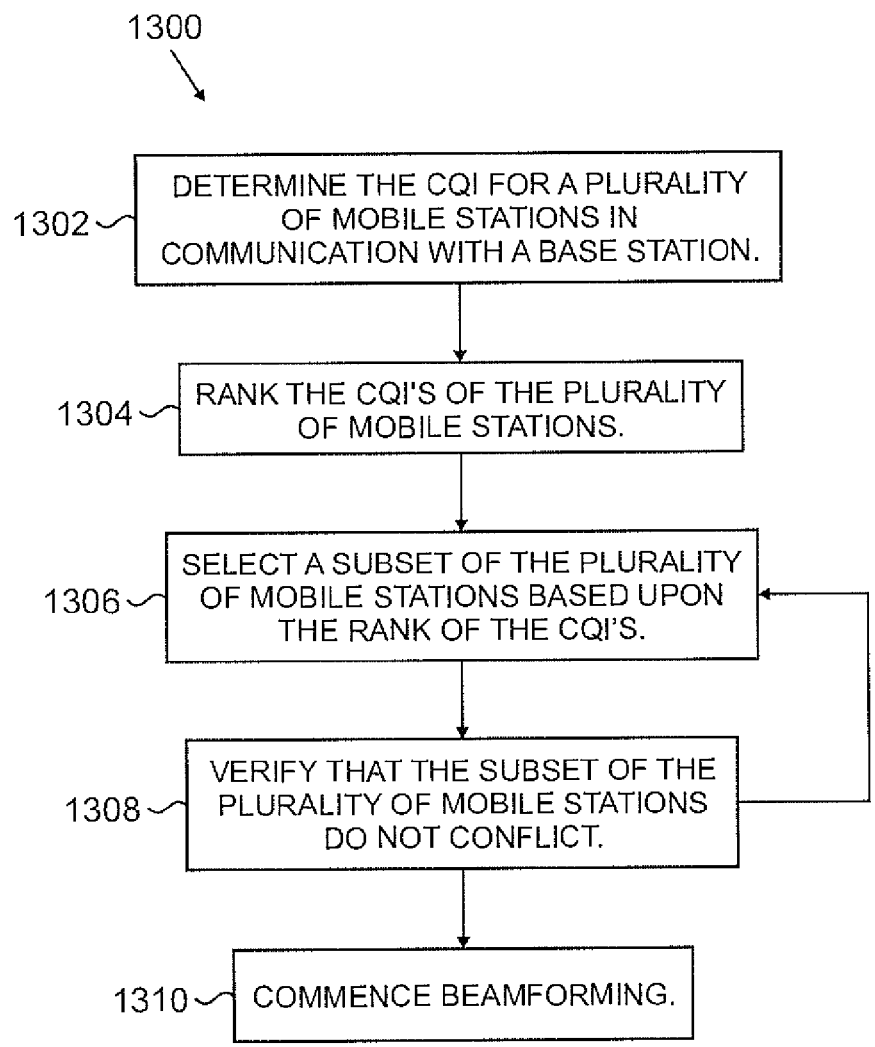
FIG. 13 is a flowchart of performing simultaneous beamforming to a plurality of clients according to an exemplary embodiment of the disclosure.

FIG. 13 is a flowchart of one method of using the disclosed systems and methods to provide simultaneous beamforming. In this example, the CQI for a plurality of mobile stations in communication with a base station is determined in block 1302. In block 1304, the CQI's of the plurality of mobile stations are ranked. In block 1306, a subset of the plurality of mobile stations is selected based upon the ranking of the CQI's. This subset may be the mobile stations with the highest CQI and second highest CQI. In block 1308, the subset of mobile stations selected in block 1306 are verified not to conflict. If there is a conflict, block 1306 is repeated. If there is not a conflict, in block 1310 beamforming is commenced.

Figure 14:
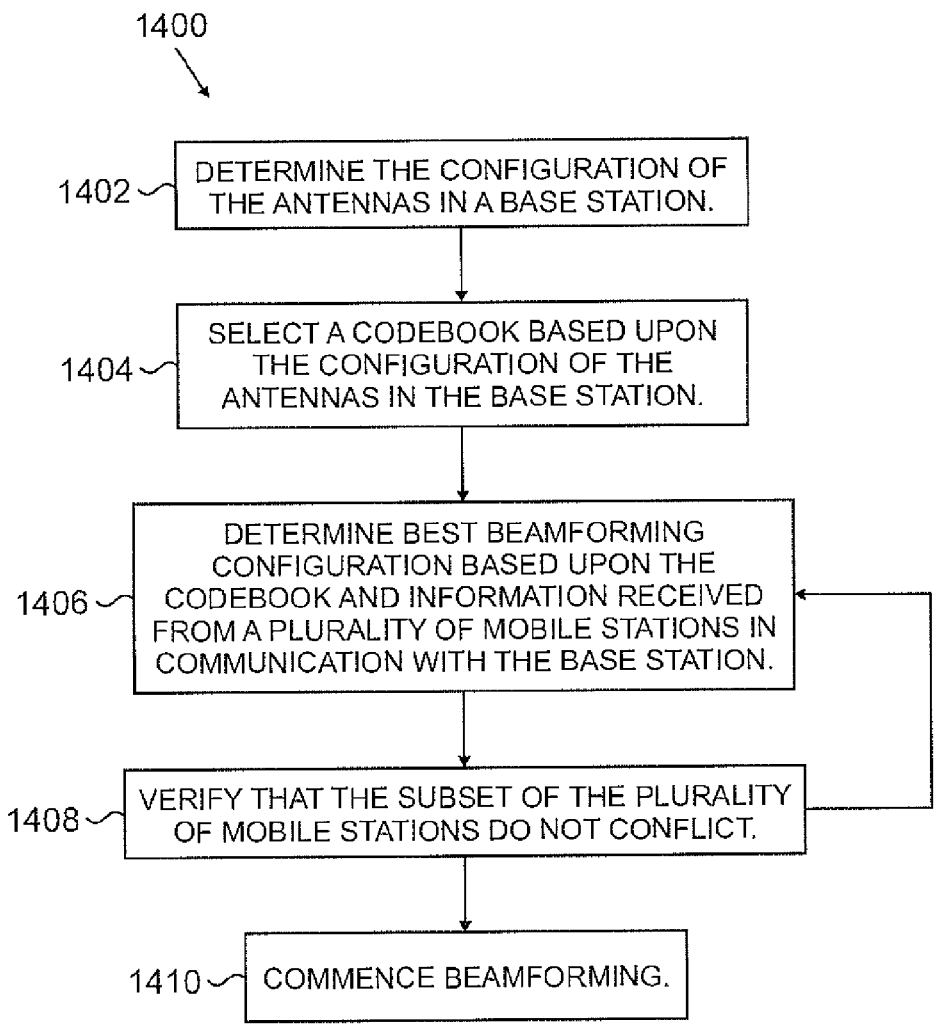
FIG. 14 is a flowchart of performing simultaneous beamforming to a plurality of clients using a known antenna configuration according to an exemplary embodiment of the disclosure.

FIG. 14 is a flowchart of one method of selecting a codebook for use in the presently disclosed systems. In block 1402, there is a determination of the configuration of the antennas in a base station. In block 1404, there is a selection of a codebook based upon the configuration of the antennas in the base station. In block 1406, there is a determination as to the best configuration of the base station based upon the codebook and information received from a plurality of mobile stations in communication with a base station. In block 1408 the base station verifies there is not a conflict in the beamforming configuration. If there is a conflict, the block 1406 is repeated. If there is no conflict, beamforming may begin.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a method of performing simultaneously beamforming, the method comprising:
   determining the Channel Quality Indicator (CQI) for communications between a plurality of mobile stations and a base station;
   ranking the plurality of mobile stations in a list according to the determined CQI;
   selecting a subset of the plurality of mobile stations for simultaneous beamformed communications;
   verifying the selected subset of the plurality of mobile stations do not have a conflict; and
   initiating beamformed communications.

2. The method as set forth in claim 1, further comprising the selecting a codebook for use in beamforming, wherein the codebook comprises the following equation as a subset of the codebook design:

$$C_j = \begin{bmatrix} w_1(\theta_j) \\ w_2(\theta_j) \\ \vdots \\ w_P(\theta_j) \end{bmatrix} = \begin{bmatrix} 1 \\ e^{-j2\pi \frac{D}{\lambda}\sin(\theta_j)} \\ e^{-j2\pi \frac{2D}{\lambda}\sin(\theta_j)} \\ \vdots \\ e^{-j2\pi \frac{(P-1)D}{\lambda}\sin(\theta_j)} \end{bmatrix} \Big/ \sqrt{P}.$$

3. The method of claim 2, wherein said codebook is selected on the basis of an antenna configuration.

4. The method of claim 3, wherein said antenna configuration is a linear antenna configuration.

5. The method of claim 4, wherein said upon detecting a conflict between two mobile station, the mobile station with the lowest CQI is removed from beamforming communications.

6. The method as set forth in claim 1, further comprising the selecting a codebook for use in beamforming, wherein the codebook comprises the following equation as a subset of the codebook design:

$$C_j = \begin{bmatrix} w_1(\theta_j) \\ w_2(\theta_j) \\ \vdots \\ w_P(\theta_j) \end{bmatrix} = \begin{bmatrix} 1 \\ e^{-j2\pi \frac{R}{\lambda}\sin(\zeta)\cos(\theta_j-\phi_1)} \\ e^{-j2\pi \frac{R}{\lambda}\sin(\zeta)\cos(\theta_j-\phi_2)} \\ \vdots \\ e^{-j2\pi \frac{R}{\lambda}\sin(\zeta)\cos(\theta_j-\phi_P)} \end{bmatrix} \Big/ \sqrt{P}.$$

7. The method of claim 1, wherein said plurality of mobile stations receive a plurality of beamformed communications from the base station.

8. The method of claim 1, wherein the subset of mobile stations comprises at least two mobile stations.

9. A wireless network comprising a plurality of mobile stations, the network comprising:
   a first mobile station capable of beamformed communication with a first base station; and
   a second mobile station capable of simultaneous beamformed communications with the first base station,
   wherein at least one of the first and second mobile stations transmit information to the base station that promotes the simultaneous beamformed communication between the first mobile station and the base station.

10. The wireless network as set forth in claim 9, wherein the information transmitted by at least one of the first and second mobile station includes CQI information.

11. The wireless network as set forth in claim 10, wherein both the first and second mobile station transmit information to the base station.

12. The wireless network as set forth in claim 9, wherein the information transmitted by the at least one first and second mobile station includes CQI channel estimation different between a dedicated pilot and a common pilot.

13. The wireless network as set forth in claim 9, wherein both the first and second mobile station transmit a single codeword as a feedback to the base station.

14. The wireless network as set forth in claim 13, wherein upon the determination of a conflict between the first and second mobile station, beamforming is only performed with the mobile station with the highest CQI.

15. The wireless network as set forth in claim 9, further comprising a third mobile station that transmits information to the base station.

16. The wireless network as set forth in claim 15, wherein beamforming is performed using the third mobile station and one of the at least one of the first mobile station and the second mobile station.

17. For use in a wireless network, a base station capable of simultaneous beamformed communication with a plurality of mobile devices, the base station comprising:
   a computer readable medium comprising information related to at least one codebook that corresponds to an antenna configuration of the base station;
   a processor configured to access the computer readable medium and use the at least one codebook to provide simultaneous communication with a plurality of mobile stations; and
   a transceiver coupled to the processor; wherein the transceiver comprises a plurality of transmit antennas and is configured to receive information from a plurality of mobile stations and transfer this information to the processor, and wherein the processor is configured to interpret the information, select a subset of mobile stations for simultaneous beamforming, and instruct the transceiver to allow for simultaneous beamforming with a plurality of mobile stations.

18. The base station of claim 17, wherein the information comprises CQI information.

19. The base station of claim 18, wherein the information is used to rank the mobile stations.

20. The method as set forth in claim 19, wherein the information is used to ensure that the plurality of mobile stations for beamforming do not use the same transmit antenna.

* * * * *